(12) United States Patent
Zhu et al.

(10) Patent No.: US 12,332,053 B2
(45) Date of Patent: Jun. 17, 2025

(54) HETERODYNE GRATING INTERFEROMETRY SYSTEM BASED ON SECONDARY DIFFRACTION

(71) Applicants: TSINGHUA UNIVERSITY, Beijing (CN); BEIJING U-PRECISION TECH CO., LTD., Beijing (CN)

(72) Inventors: Yu Zhu, Beijing (CN); Leijie Wang, Beijing (CN); Ziwen Guo, Beijing (CN); Ming Zhang, Beijing (CN); Rong Cheng, Beijing (CN); Weinan Ye, Beijing (CN); Zhaokui Cheng, Beijing (CN)

(73) Assignees: Tsinghua University, Beijing (CN); Beijing U-Precision Tech Co., Ltd., Beijing (CN)

( * ) Notice: Subject to any disclaimer, the term of this patent is extended or adjusted under 35 U.S.C. 154(b) by 172 days.

(21) Appl. No.: 18/246,670

(22) PCT Filed: Sep. 14, 2021

(86) PCT No.: PCT/CN2021/118261
§ 371 (c)(1),
(2) Date: Mar. 24, 2023

(87) PCT Pub. No.: WO2022/062967
PCT Pub. Date: Mar. 31, 2022

(65) Prior Publication Data
US 2023/0366667 A1     Nov. 16, 2023

(30) Foreign Application Priority Data
Sep. 25, 2020  (CN) .......................... 202011022001.8

(51) Int. Cl.
G01B 9/02002  (2022.01)
G01B 9/02     (2022.01)
(Continued)

(52) U.S. Cl.
CPC ...... *G01B 9/02002* (2013.01); *G01B 9/02003* (2013.01); *G01B 9/02015* (2013.01);
(Continued)

(58) Field of Classification Search
CPC ............ G01B 9/02002; G01B 2290/70; G01B 2290/60; G01B 9/02003; G01B 9/02015;
(Continued)

(56) References Cited

U.S. PATENT DOCUMENTS 10,907,950 B1 *  2/2021  Bai ..................... G01B 9/02015
11,802,757 B2 * 10/2023  Hu ...................... G01B 9/02007
(Continued)

FOREIGN PATENT DOCUMENTS

CN  101629810 A  *  1/2010  ............. G01B 11/02
CN  102944176 A     2/2013
(Continued)

OTHER PUBLICATIONS

Lee, Ju-Yi, et al., "Heterodyne grating interferometer based on a quasi-common-optical-path configuration for a two-degrees of freedom straightness measurement", Applied Optics; vol. 50, Issue 9, 2011, 1272-1279.
(Continued)

*Primary Examiner* — Tarifur R Chowdhury
*Assistant Examiner* — Kaitlyn E Kidwell
(74) *Attorney, Agent, or Firm* — Holzer Patel Drennan (57) ABSTRACT

Disclosed is a heterodyne grating interferometry system based on secondary diffraction, including a single-frequency laser, an input optical fiber, an acousto-optic modulator, a reading head, and a measurement grating, an output optical fiber, a photoelectric conversion unit and an electronic signal processing unit, wherein the single-frequency laser emits a single-frequency laser, which enters the acousto-optic modulator through the input optical fiber, and is divided into
(Continued)

a reference light and measurement light to be input to the reading head, wherein the reading head and the measurement grating convert the reference light and measurement light into a reference interference optical signal and a measurement interference optical signal and send them to the photoelectric conversion unit through the output optical fiber and wherein the photoelectric conversion unit converts the measurement interference optical signal and the reference interference optical signal into a measurement interference electrical signal and a reference interference electrical signal.

9 Claims, 5 Drawing Sheets (51) Int. Cl.
*G01B 9/02003* (2022.01)
*G01B 9/02015* (2022.01)
*G01B 9/02055* (2022.01)
*G01B 9/02056* (2022.01)
*G01B 11/02* (2006.01)
*G02B 27/28* (2006.01)

(52) U.S. Cl.
CPC ...... *G01B 9/02024* (2013.01); *G01B 9/02027* (2013.01); *G01B 9/02028* (2013.01); *G01B 9/02051* (2013.01); *G01B 9/02059* (2013.01); *G01B 9/0207* (2013.01); *G01B 11/02* (2013.01); *G01B 2290/60* (2013.01); *G01B 2290/70* (2013.01); *G02B 27/283* (2013.01)

(58) Field of Classification Search
CPC .............. G01B 9/02059; G01B 9/0207; G01B 9/02027; G01B 11/02; G01B 9/02024; G01B 9/02028; G01B 9/02051; G02B 27/283

See application file for complete search history.

(56) References Cited

U.S. PATENT DOCUMENTS

2009/0168074 A1 7/2009 Monchalin et al.
2015/0338205 A1 11/2015 Zhang et al.

FOREIGN PATENT DOCUMENTS

| CN | 103604375 A | | 2/2014 | |
| CN | 103673892 A | | 3/2014 | |
| CN | 103759654 A | | 4/2014 | |
| CN | 108106536 A | * | 6/2018 | ............. G01B 11/02 |
| CN | 108627099 A | | 10/2018 | |
| CN | 108627100 A | | 10/2018 | |
| CN | 109579694 A | | 4/2019 | |
| CN | 110837214 A | * | 2/2020 | ......... G03F 7/70025 |
| CN | 112229332 A | | 1/2021 | |
| JP | 2017083510 A | | 5/2017 | |
| WO | 2014071807 A1 | | 5/2014 | |

OTHER PUBLICATIONS

Zhu, Yu, et al., "Two Degree-of-Freedom Fiber-Coupled Heterodyne Grating Interferometer with Milli-Radian Operating Range of Rotation.", Optics and Precision Engineering; vol. 27, No. 8, Aug. 2019, 1728-1736.

* cited by examiner

HETERODYNE GRATING INTERFEROMETRY SYSTEM BASED ON SECONDARY DIFFRACTION

TECHNICAL FIELD

The present disclosure relates to the technical field of grating measurement, in particular to a heterodyne grating interferometry system based on secondary diffraction.

DESCRIPTION OF RELATED ART

Due to the improvement of precision and ultra-precision processing technology, the positioning accuracy and measurement accuracy of processing and measurement systems have also been improved. Especially, in the high-end ultra-precision instrument industry such as lithography machines, the measurement accuracy requirements have even reached sub-nanometer level. Displacement measurement technology includes a variety of types according to principles, including capacitive type, Hall type, grating ruler type, laser interferometry type, etc. Among them, laser interferometry technology occupies an increasingly important position in the development process of high-precision displacement measurement due to its technical advantages such as high precision, high dynamics, and large stroke, and has been widely valued in modern high-precision measurement tasks.

The traditional laser interferometer uses the laser wavelength as the measurement reference, and its environmental robustness is poor, and it cannot achieve good results when propagating laser light in a non-vacuum, which is obviously difficult to be well applied on ultra-precision machine tools; compared with traditional laser interferometer, grating interferometer realizes displacement measurement according to grating diffraction and light interference principle, grating interferometer uses grating pitch as measurement reference instead of light wavelength, and grating interferometry technology obtains extremely high environmental robustness, so grating interferometry technology has more advantages in sub-nanometer measurement repeatability.

A large number of scientific research personnel and scientific research institutions have made contributions to the measurement requirements of grating interferometers in industrial production. For example: U.S. Patent Publication No. US2011/0255096A1 (published on Oct. 20, 2011) of ZYGO Corporation of the United States proposes a heterodyne grating interferometer which adopts the method of measurement light vertically incident on the diffraction grating to obtain positive and negative first-order diffracted light, which can simultaneously measure the in-plane and vertical two-degree-of-freedom linear displacement, but the 0th-order diffracted light of the measurement grating returns along the incident light path, resulting in measurement errors, and therefore, it is not suitable for highly integrated ultra-precision instruments, such as lithography machines; the US Patent Publication No. US2011/0096334A1 (published on Apr. 28, 2011) of CANON Corporation of Japan discloses a heterodyne interferometer in which a grating is used as the objective reflector, but the interferometer can only achieve single-degree-of-freedom displacement measurement; the US Patent Publication No. US2012/0194824A1 (published on Aug. 2, 2012) of ZYGO Corporation of the United States proposes a two-degree-of-freedom heterodyne grating interferometer with a simple structure which uses a retroreflector to generate secondary diffracted light, and the system resolution is high, whereas the commonness of the optical paths of the measurement light and reference light is poor and the grating rotation angle tolerance is small.

In the actual use of the grating interferometer, there are still some problems that need to be solved urgently, such as: the periodic nonlinear error caused by the polarization aliasing error; interference fringes formed on the detector when there is a grating rotation angle error due to vibration, installation, etc., affecting signal quality; errors caused during transmission in optical fiber; resolution and measurement accuracy of the grating interferometer; whether a single grating interferometer can achieve displacement measurement with as many degrees of freedom and a larger stroke as possible; the size and integration of the grating interferometer, etc.

SUMMARY

In order to solve the problems existing in the related art and meet the future development needs of this field, the present disclosure provides a heterodyne grating interferometry system based on secondary diffraction, including a single-frequency laser, an input optical fiber, an acousto-optic modulator, a reading head, a measurement grating, an output optical fiber, a photoelectric conversion unit and an electronic signal processing unit, wherein the single-frequency laser emits a single-frequency laser, which enters the acousto-optic modulator through the input optical fiber, and is divided into a reference light and measurement light to be input to the reading head, wherein the reading head and the measurement grating convert the reference light and measurement light into a reference interference optical signal and a measurement interference optical signal and send them to the photoelectric conversion unit through the output optical fiber, and wherein the photoelectric conversion unit converts the measurement interference optical signal and the reference interference optical signal into a measurement interference electrical signal and a reference interference electrical signal and sends them to the electronic signal processing unit, and calculates 2-degree-of-freedom linear displacement of the measurement grating.

In an embodiment, the reading head includes an interferometer lens group, wherein the single-frequency laser emits multiple beams of single-frequency laser, wherein the multiple beams of single-frequency laser are divided into multiple beams of reference light and multiple beams of measurement light by the acousto-optic modulator, wherein the multiple beams of reference light and the multiple beams of measurement light are transmitted in a space-separated manner, and enter the interferometer lens group at respective different positions, and generate multiple channels of measurement interference signals and multiple channels of reference interference signals.

Preferably, the interferometer lens group includes a plurality of reflectors, a plurality of quarter-wave plates, a plurality of polarization beam splitters, a plurality of retroreflectors, a plurality of lateral beam splitter prisms and a plurality of refractors; the single-frequency laser emits multiple beams of single-frequency lasers, and the multiple beams of single-frequency lasers are divided into multiple beams of reference light and multiple beams of measurement light by the acousto-optic modulator; each of the multiple beams of reference light enters respective polarization beam splitters and each of the multiple beams of measurement light enter respective polarization beam splitters so as to be reflected and transmitted, to form multiple beams of reflected measurement light, multiple beams of transmitted measurement light, multiple beams of reflected reference light and multiple beams of transmitted reference light; the multiple beams of reflected measurement light pass through the respective quarter-wave plates, the respective refractors, the measurement grating, the respective refractors, the respective quarter-wave plates, the respective polarization beam splitters and the respective retroreflectors to be reflected multiply times, to form multiple beams of first measurement light; the multiple beams of transmitted measurement light pass through respective lateral beam splitter prisms to form multiple beams of second measurement light; the multiple beams of reflected reference light pass through the respective quarter-wave plates, the respective reflectors, the respective polarization beam splitters, the respective retroreflectors and the respective lateral beam splitter prisms to be reflected multiply times, to form multiple beams of first reference light; the multiple beams of transmitted reference light pass through respective lateral beam splitter prisms to form multiple beams of second reference light; and the multiple beams of first measurement light and second measurement light interfere with the reference light to form the multiple channels of measurement interference signals, and the multiple beams of first reference light and second reference light interfere with the measurement light to form the multiple channels of reference interference signals.

Preferably, the interferometer lens group includes a first polarization beam splitter, a second polarization beam splitter, a first lateral beam splitter prism, a second lateral beam splitter prism, a third lateral beam splitter prism, a fourth lateral beam splitter prism, a first retroreflector, a second retroreflector, a third retroreflector, a fourth retroreflector, a first quarter-wave plate, a second quarter-wave plate, a first reflector, a second reflector, a first refractor and a second refractor.

In an embodiment, the single-frequency laser emits two beams of single-frequency laser to form two beams of measurement light and two beams of reference light after passing through the acousto-optic modulator.

In an embodiment, one beam of measurement light passes through the first polarization beam splitter to be reflected and transmitted so as to form a beam of first reflected measurement light and a beam of first transmitted measurement light, and another beam of reference light passes through the first polarization beam splitter to be reflected and transmitted so as to form a beam of first reflected reference light and a beam of first transmitted reference light.

In an embodiment, the first reflected measurement light sequentially passes through the first quarter-wave plate, the first refractor, the measurement grating, the first refractor, the first quarter-wave plate, the first polarization beam splitter, the first retroreflector, the first polarization beam splitter, the first quarter-wave plate, the first refractor, the measurement grating, the first refractor, the first polarization beam splitter, and the first lateral beam splitter prism to form the first measurement light.

In an embodiment, the first transmitted measurement light passes through the second lateral beam splitter prism to form the second measurement light.

In an embodiment, the first reflected reference light sequentially passes through the first quarter-wave plate, the first reflector, the first quarter-wave plate, the first polarization beam splitter, the second retroreflector, the first polarization beam splitter, the first quarter-wave plate, the first reflector, the first quarter-wave plate, the first polarization beam splitter, and the first lateral beam splitter prism to form the first reference light.

In an embodiment, the first transmitted reference light passes through the second lateral beam splitter prism to form the second reference light.

In an embodiment, the first measurement light interferes with the first reference light to form a first measurement interference signal and the second measurement light interferes with the second reference light to form a first reference interference signal.

In an embodiment, the other beam of measurement light passes through the second polarization beam splitter to be reflected and transmitted so as to form a beam of second reflected measurement light and a beam of second transmitted measurement light, and the other beam of reference light passes through the second polarization beam splitter to be reflected and transmitted so as to form a beam of second reflected reference light and a beam of second transmitted reference light.

In an embodiment, the second reflected measurement light sequentially passes through the second quarter-wave plate, the second refractor, the measurement grating, the second refractor, the second quarter-wave plate, the second polarization beam splitter, the third retroreflector, the second polarization beam splitter, the second quarter-wave plate, the second refractor, the measurement grating, the second refractor, the second polarization beam splitter and the third lateral beam splitter prism to form a third measurement light.

In an embodiment, the second transmitted measurement light passes through the fourth lateral beam splitter prism to form a fourth measurement light.

In an embodiment, the second reflected reference light passes through the second quarter-wave plate, the second reflector, the second quarter-wave plate, the second polarization beam splitter, the fourth retroreflector, the second polarization beam splitter, the second quarter-wave plate, the second reflector, the second quarter-wave plate, the second polarization beam splitter, and the third lateral beam splitter prism to form a third reference light.

In an embodiment, the second transmitted reference light passes through the fourth lateral beam splitter prism to form a fourth reference light.

In an embodiment, the third measurement light interferes with the third reference light to form a second measurement interference signal and the fourth measurement light interferes with the fourth reference light to form a second reference interference signal.

Furthermore, preferably, each of the polarization beam splitters has two lateral beam splitter prism respectively disposed in front of and behind the polarization beam splitter, each of the polarization beam splitters has two retroreflector disposed therebelow; each of the polarization beam splitters has one quarter-wave plate disposed thereabove and each of quarter-wave plates has one reflector and one refractor disposed in parallel thereabove.

Preferably, the first measurement light and the second measurement light interfere with the reference light to form two channels of measurement interference signals, and the first reference light and the second reference light interfere with the measurement light to form two channels of reference interference signals.

Preferably, the input optical fiber includes a polarization-maintaining optical fiber, the output optical fiber includes a multimode optical fiber, and the measurement grating includes a one-dimensional reflective grating, and the retroreflector includes a corner cube retroreflector.

Preferably, the refractor satisfies the Littrow angle incident condition of the measurement light.

Furthermore, preferably, the reflected measurement light forms primary diffracted light after being diffracted by the measurement grating; the primary diffracted light sequentially passes through the refractor, the quarter-wave plate and the polarization beam splitter and enters the retroreflector; the retroreflector emits the incident primary diffracted light in parallel; and the emitted primary diffracted light sequentially passes through the polarization beam splitter, the quarter-wave plate, and the refractor and enters the measurement grating again in the Littrow angle so as to form a secondary diffracted light.

Preferably, the measurement grating performs in-plane and vertical linear motions with two degrees of freedom relative to the reading head.

Preferably, the reading head is disposed in a modular arrangement, including a first reading head module and a second reading head module, wherein the first reading head module generates the first measurement interference signal and the first reference interference signal, and the second reading head module generates the second measurement interference signal and the second reference interference signal, wherein optical paths in the first reading head module and the second reading head module are not interfered with each other and wherein the first reading head module and the second reading head module are connected through a connecting member.

Preferably, the single-frequency laser emits a single-frequency laser that simultaneously contains s-polarized component and p-polarized component.

Compared with the related art, the heterodyne grating interferometry system based on secondary diffraction according to the present disclosure has the following advantages.

The measurement light and reference light are transmitted in a space-separated manner, which effectively avoids periodic nonlinear errors caused by polarization aliasing errors.

The error generated during transmission in optical fiber is effectively suppressed, specifically, after the first measurement light and the first reference light pass through the first polarization beam splitter, the first reflected measurement light and the first reflected reference light pass through multiple lens groups to generate the first measurement interference signal; after the first measurement light and the first reference light pass through the first polarization beam splitter, the first transmitted measurement light and the first transmitted reference light directly pass through the lateral beam splitter prism to generate the first reference interference signal; difference between the first measurement interference signal and the first reference interference signal is calculated so as to substantially eliminate the error generated during the transmission process of the first measurement light and the first reference light in the single-mode fiber. Similarly, the difference between the second measurement interference signal and the second reference interference signal is calculated so as to substantially eliminate the error generated during the transmission process of the second measurement light and the second reference light in the single-mode optical fiber.

The reading head adopts modular arrangement, which reduces the difficulty of installation and alignment of the reading head.

The secondary diffracted light is used as the measurement signal to achieve the purpose of four-time subdivision of the signal, which achieves a higher optical subdivision compared to the primary diffracted light measurement system.

Four identical retroreflector (corner cube retroreflector) structures are used. When there is a rotation angle error in the measurement grating, the measurement light and the reference light can always interfere in parallel, and there will be no interference fringes. Therefore, compared to the traditional grating interferometer, the present grating interferometer measurement system has a higher rotation angle tolerance.

The heterodyne grating interferometry system based on the secondary diffraction according to the present disclosure can simultaneously realize the measurement of in-plane and vertical displacements of the grating and the grating interferometry system adopts the Littrow angle arrangement, so that regardless of the vertical movement of the measurement grating, the positive first-order or negative first-order diffracted light can always re-enter the reading head along the original optical path, thereby realizing the measurement of large vertical travel displacement measurement of the measurement grating.

The heterodyne grating interferometry system based on the secondary diffraction according to the present disclosure has compact structure, high degree of integration, convenient arrangement and wide application range.

In the drawings, 1—single—frequency laser, 2—input optical fiber, 3—acousto-optic modulator, 4—reading head, 5—measurement grating, 6—output optical fiber, 7—photoelectric conversion unit, 8—electronic signal processing unit, 41—first measurement laser, 42—the first reference laser, 43—reflector, 44—quarter-wave plate, 45—polarization beam splitter, 46—retroreflector, 47—lateral beam splitter prism, 48—second measurement laser, 49—second reference laser, 410—refractor, 411—connecting member, 412—first measurement interference signal, 413—first reference interference signal, 414—second measurement interference signal, 415—second reference interference signal, 401—first refractor, 402—second refractor, 431—first reflector, 432—second reflector, 441—first quarter-wave plate, 442—second quarter-wave plate, 451—first polarization beam splitter, 452—second polarization beam splitter, 461—first retroreflector, 462—second retroreflector, 463—third retroreflector, 464—fourth retroreflector, 471—first lateral beam splitter prism, 472—second lateral beam splitter prism, 473—third lateral beam splitter prism, 474—fourth lateral beam splitter prism.

DETAILED DESCRIPTIONS

The technical solutions of the present disclosure will be clearly and completely described below in conjunction with the accompanying drawings. Apparently, the described embodiments are some of the embodiments of the present disclosure, but not all of them. Based on the embodiments of the present disclosure, all other embodiments obtained by persons of ordinary skill in the art without making creative efforts belong to the protection scope of the present disclosure.

In the description of the present disclosure, it should be noted that the orientation or positional relationship indicated by terms "center", "upper", "lower", "left", "right", "vertical", "horizontal", "inner", "outer" etc. is based on the orientation or positional relationship shown in the drawings, and is only for the convenience of describing the present disclosure and simplifying the description, rather than indicating or implying that the referred device or element necessarily has a specific orientation, or configured and operated in a specific orientation. Therefore, it should not be construed as limiting the disclosure. In addition, terms such as "first", "second", and "third" are used for descriptive purposes only, and should not be construed as indicating or implying relative importance.

Figure 1:
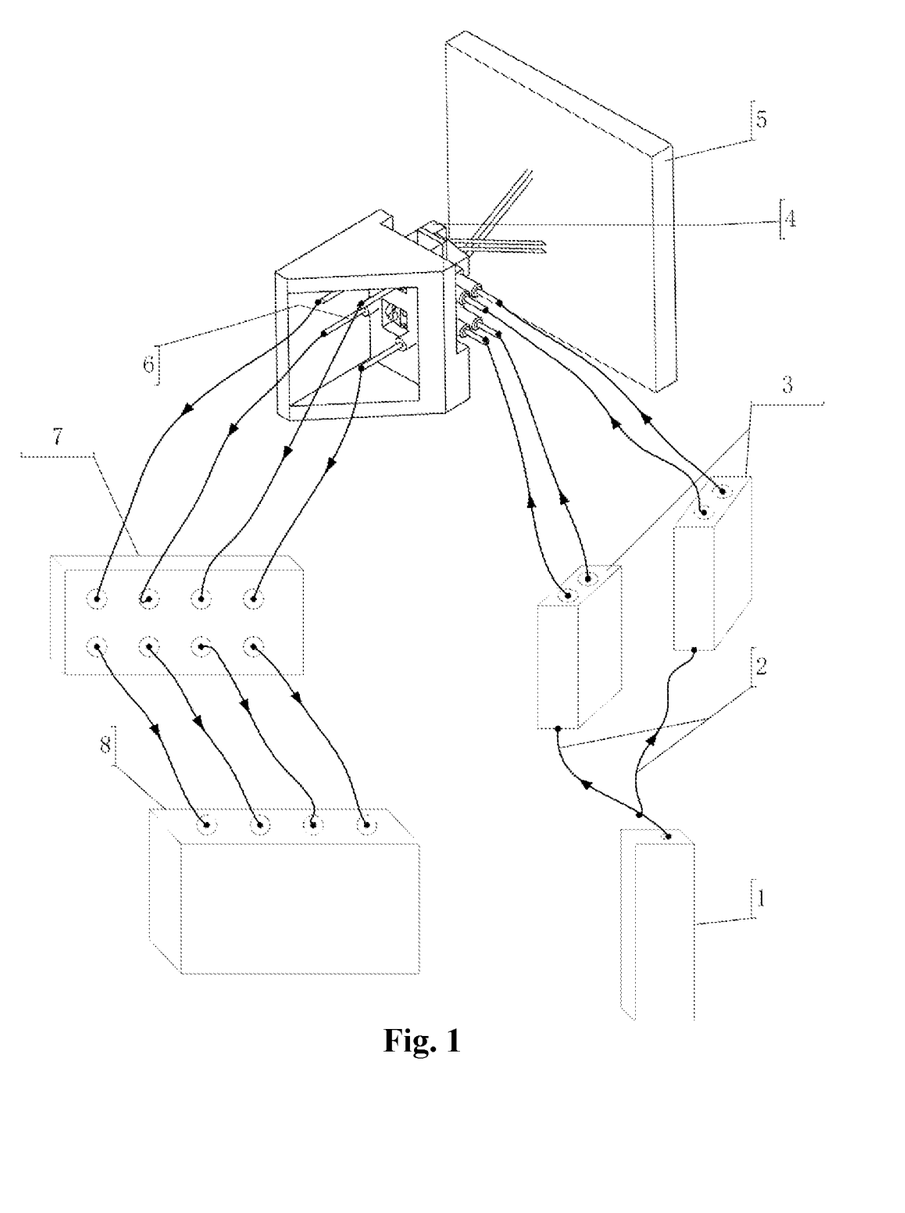
FIG. 1 is a schematic diagram of a heterodyne grating interference displacement measurement system based on secondary diffraction according to the present disclosure.

FIG. 1 is the schematic diagram of the heterodyne grating interferometry system based on secondary diffraction according the present disclosure. As shown in FIG. 1, the system includes a single-frequency laser 1, an input optical fiber 2, an acousto-optic modulator 3, a reading head 4, and a measurement grating 5, an output optical fiber 6, a photoelectric conversion unit 7 and an electronic signal processing unit 8. The single-frequency laser 1 emits a single-frequency laser, which enters the acousto-optic modulator 3 through the input optical fiber 2, and is divided into a reference light and measurement light to be input to the reading head 4. The reading head 4 and the measurement grating 5 convert the reference light and measurement light into a reference interference optical signal and a measurement interference optical signal and send them to the photoelectric conversion unit 7 through the output optical fiber 6. The photoelectric conversion unit 7 converts the measurement interference optical signal and the reference interference optical signal into a measurement interference electrical signal and a reference interference electrical signal and sends them to the electronic signal processing unit 8, and calculates a linear displacement of the measurement grating 5.

The reading head 4 includes an interferometer lens group. The single-frequency laser 1 emits multiple beams of single-frequency laser. The multiple beams of single-frequency laser are divided into multiple beams of reference light and multiple beams of measurement light by the acousto-optic modulator 3. The multiple beams of reference light and the multiple beams of measurement light are transmitted in a space-separated manner, and enter the interferometer lens group at respective different positions, and generate multiple channels of measurement interference signals and multiple channels of reference interference signals.

Preferably, the measurement grating performs an in-plane and vertical 2-degree-of-freedom linear motion relative to the reading head, thereby realizing the measurement of the two-degree-of-freedom linear displacement of the measurement grating 5 by the single-frequency laser 1, the input optical fiber 2, the acousto-optic modulator 3, the reading head 4, the output optical fiber 6, the photoelectric conversion unit 7 and the electronic signal processing unit 8.

The interferometry system of the present disclosure can simultaneously measure the in-plane and vertical two-degree-of-freedom large-stroke displacement of the target grating, and achieves higher optical subdivision compared to the primary diffracted light measurement system. Meanwhile, it also effectively suppresses polarization aliasing errors and fiber transmission errors. The interferometry system has the advantages of small size, light weight, and convenient arrangement. It is suitable for occasions requiring multi-degree-of-freedom displacement precise measurement, such as photolithography machine ultra-precision workbenches and precision machine tools.

Figure 2:
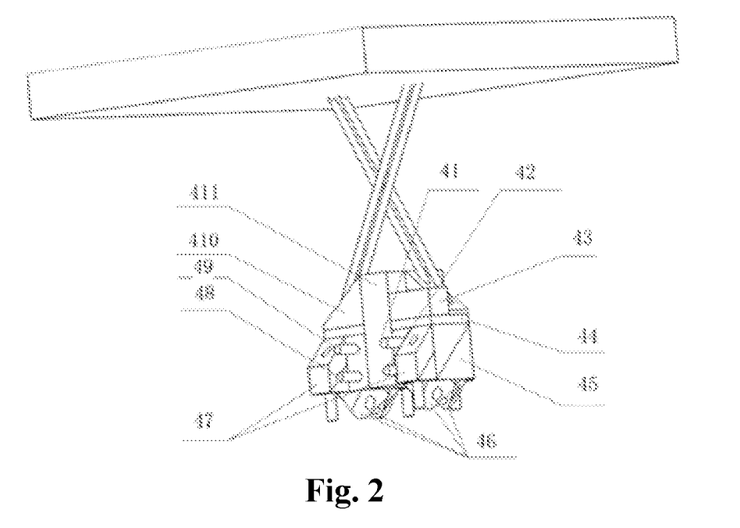
FIGS. 2, 3, and 4 are the schematic diagrams of the interferometer lens group of the present disclosure under the same viewing angle.

FIG. 2 is a schematic view of the interferometer lens group according the present disclosure at a viewing angle.

As shown in FIG. 2, the interferometer lens group includes a plurality of reflectors 43, a plurality of quarter-wave plates 44, a plurality of polarization beam splitters 45, a plurality of retroreflectors 46, a plurality of lateral beam splitter prisms 47 and a plurality of refractors 410. The single-frequency laser 1 emits multiple beams of single-frequency lasers, and the multiple beams of single-frequency lasers are divided into multiple beams of reference light and multiple beams of measurement light by the acousto-optic modulator 3. Each of the multiple beams of reference light enters respective polarization beam splitters 45 and each of the multiple beams of measurement light enter respective polarization beam splitters, so as to be reflected and transmitted, to form multiple beams of reflected measurement light, multiple beams of transmitted measurement light, multiple beams of reflected reference light and multiple beams of transmitted reference light. The multiple beams of reflected measurement light pass through the respective quarter-wave plates 44, the respective refractors 410, the measurement grating 5, the respective refractors 410, the respective quarter-wave plates 44, the respective polarization beam splitters 45 and the respective retroreflectors 46 to be reflected multiply times, to form multiple beams of first measurement light. The multiple beams of transmitted measurement light pass through respective lateral beam splitter prisms 47 to form multiple beams of second measurement light. The multiple beams of reflected reference light pass through the respective quarter-wave plates 44, the respective reflectors 43, the respective polarization beam splitters 45, the respective retroreflectors 46 and the respective lateral beam splitter prisms 47 to be reflected multiply times, to form multiple beams of first reference light. The multiple beams of transmitted reference light pass through respective lateral beam splitter prisms 47 to form multiple beams of second reference light. The multiple beams of first measurement light and the multiple beams of second measurement light interfere with the reference light to form the multiple channels of measurement interference signals, and the multiple beams of first reference light and second reference light interfere with the measurement light to form the multiple channels of reference interference signals.

In an embodiment, the reading head 4 adopts a modular arrangement. Specifically, each of the polarization beam splitters has two lateral beam splitter prism respectively disposed in front of and behind the polarization beam splitter, each of the polarization beam splitters has two retroreflector disposed therebelow; each of the polarization beam splitters has one quarter-wave plate disposed thereabove and each of quarter-wave plates has one reflector and one refractor disposed in parallel thereabove. The components of the reading head 4 are closely connected and fixed to each another, and therefore, the structure is compact and it is convenient to be installed.

Preferably, the reading head includes a first reading head module and a second reading head module. The first reading head module generates the first measurement interference signal and the first reference interference signal, and the second reading head module generates the second measurement interference signal and the second reference interference signal. Optical paths in the first reading head module and the second reading head module are not interfered with each other. The first reading head module and the second reading head module are connected through a connecting member 411. The connecting member has a cuboid shape, and each of the first reading head module and the second reading head module is bonded to the connecting member.

Figure 3:
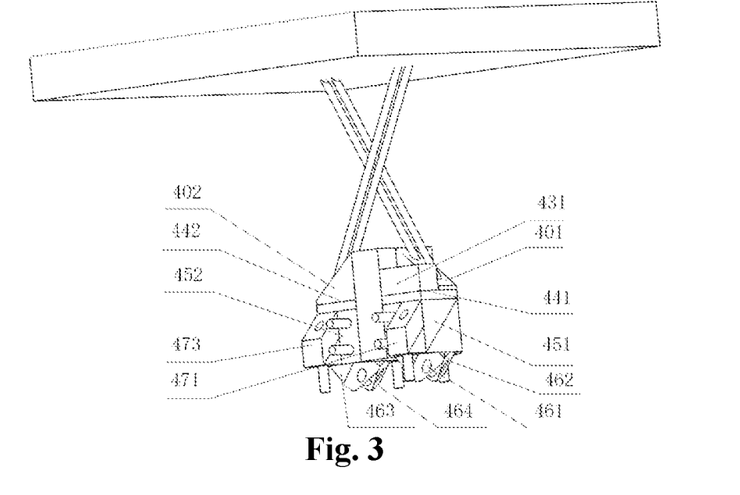
Figure 4:
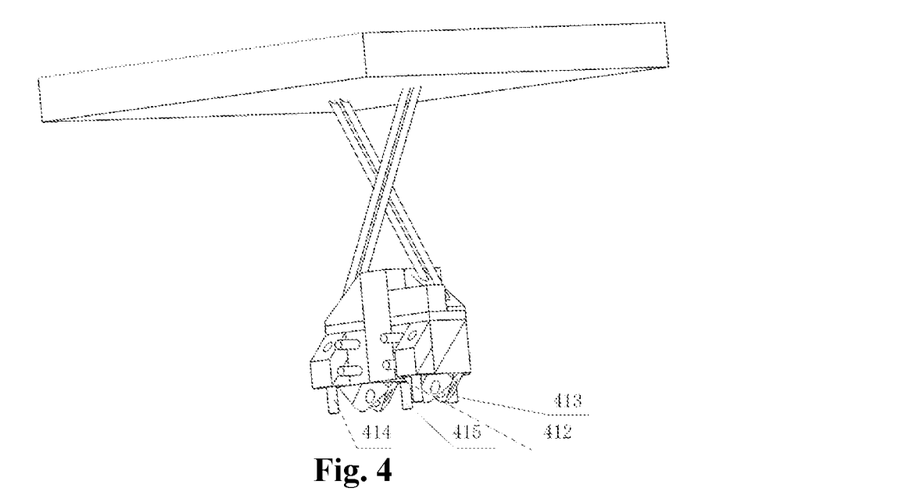
Figure 5:
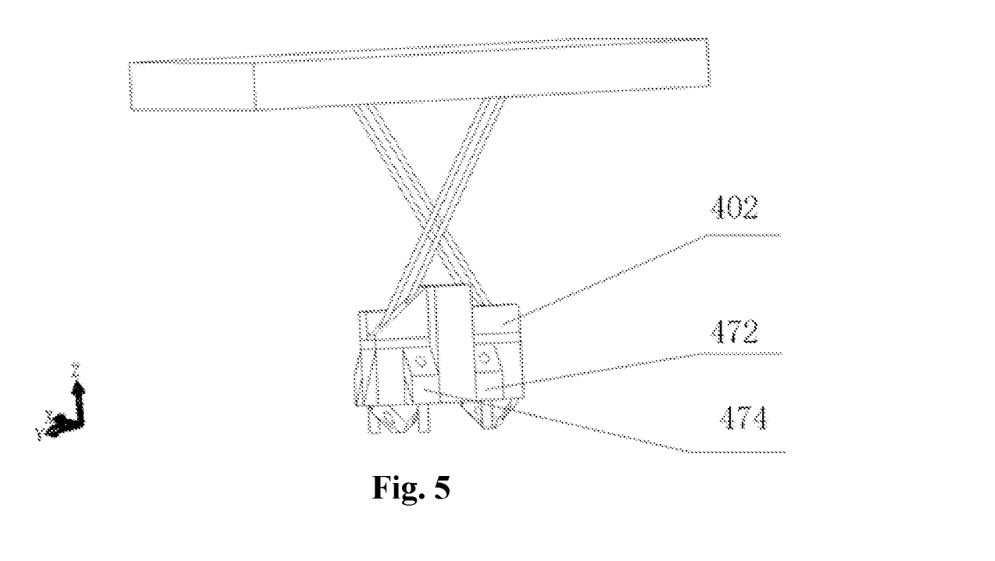
FIG. 5 is a schematic diagram of the interferometer lens group of the present disclosure under another viewing angle.

In a preferred embodiment, FIGS. 2, 3, and 4 are schematic diagrams of the interferometer lens group of the present disclosure at the same viewing angle, and FIG. 5 is a schematic diagram of the interferometer lens group of the present disclosure at another viewing angle. As shown in FIGS. 2-5, the interferometer lens group includes a first polarization beam splitter 451, a second polarization beam splitter 452, a first lateral beam splitter prism 471, a second lateral beam splitter prism 472, a third lateral beam splitter prism 573, a fourth lateral beam splitter prism 474, a first retroreflector 461, a second retroreflector 462, a third retroreflector 463, a fourth retroreflector 464, a first quarter-wave plate 441, a second quarter-wave plate 442, a first reflector 431, a second reflector 432, a first refractor 401 and a second refractor 402.

The single-frequency laser 1 emits two beams of single-frequency laser to form two beams of measurement light and two beams of reference light after passing through the acousto-optic modulator 3. One beam of measurement light passes through the first polarization beam splitter 451 for reflection and transmission so as to form a beam of first reflected measurement light and a beam of first transmitted measurement light, and the other beam of reference light passes through the first polarization beam splitter 451 for reflection and transmission so as to form a beam of first reflected reference light and a beam of first transmitted reference light.

The first reflected measurement light sequentially passes through the first quarter-wave plate 441, the first refractor 401, the measurement grating, the first refractor 401, the first quarter-wave plate 441, the first polarization beam splitter, the first retroreflector 461, the first polarization beam splitter, the first quarter-wave plate 441, the first refractor 401, the measurement grating, the first refractor 401, the first polarization beam splitter, and the first lateral beam splitter prism 471 to form the first measurement light.

The first transmitted measurement light passes through the second lateral beam splitter prism 472 to form the second measurement light.

The first reflected reference light sequentially passes through the first quarter-wave plate 441, the first reflector 431, the first quarter-wave plate 441, the first polarization beam splitter, the second retroreflector 462, the first polarization beam splitter, the first quarter-wave plate 441, the first reflector 431, the first quarter-wave plate 441, the first polarization beam splitter, and the first lateral beam splitter prism 471 to form the first reference light.

The first transmitted reference light passes through the second lateral beam splitter prism 472 to form the second reference light.

The first measurement light interferes with the first reference light to form a first measurement interference signal 412 and the second measurement light interferes with the second reference light to form a first reference interference signal 413.

The other beam of measurement light passes through the second polarization beam splitter 452 for reflection and transmission so as to form a beam of second reflected measurement light and a beam of second transmitted measurement light, and the other beam of reference light passes through the second polarization beam splitter 452 for reflection and transmission so as to form a beam of second reflected reference light and a beam of second transmitted reference light.

The second reflected measurement light sequentially passes through the second quarter-wave plate 442, the second refractor 402, the measurement grating, the second refractor 402, the second quarter-wave plate 442, the second polarization beam splitter 452, the third retroreflector 463, the second polarization beam splitter 452, the second quarter-wave plate 442, the second refractor 402, the measurement grating, the second refractor 402, the second polarization beam splitter 452 and the third lateral beam splitter prism 473 to form a third measurement light.

The second transmitted measurement light passes through the fourth lateral beam splitter prism 474 to form a fourth measurement light.

The second reflected reference light passes through the second quarter-wave plate 442, the second reflector 432, the second quarter-wave plate 442, the second polarization beam splitter 452, the fourth retroreflector 464, the second polarization beam splitter 452, the second quarter-wave plate 442, the second reflector 432, the second quarter-wave plate 442, the second polarization beam splitter 452, and the third lateral beam splitter prism 473 to form a third reference light.

The second transmitted reference light passes through the fourth lateral beam splitter prism 474 to form a fourth reference light.

The third measurement light interferes with the third reference light to form a second measurement interference signal 414, and the fourth measurement light interferes with the fourth reference light to form a second reference interference signal 415.

The single-frequency laser provides two beams of reference light and two beams of measurement light whereby two measurement interference signals and two reference interference signals are generated by the reading head. Here, the two reference interference electrical signals are used to suppress errors caused during transmission in optical fiber. Meanwhile, the reading head adopts modular arrangement, which reduces the difficulty in installation and alignment of the reading head.

In the above-mentioned embodiments, preferably, the refractor 410 satisfies the Littrow angle incident condition of the measurement light. The reflected measurement light forms primary diffracted light after being diffracted by the measurement grating 5. The primary diffracted light sequentially passes through the refractor, the quarter-wave plate and the polarization beam splitter, and enters the retroreflector. The retroreflector emits the incident primary diffracted light in parallel. The emitted primary diffracted light sequentially passes through the polarization beam splitter, the quarter-wave plate, and the refractor and enters the measurement grating again in the Littrow angle so as to form a secondary diffracted light.

The present disclosure adopts a secondary diffracted light measurement system to achieve higher system resolution; the layout adopts a Littrow-type arrangement, so that the primary diffracted light and secondary diffracted light that reach the measurement grating return along the original path and enter the reading head again.

In one embodiment, the input optical fiber 2 is a polarization-maintaining optical fiber, the output optical fiber 6 is a multimode optical fiber, the measurement grating 5 is a one-dimensional reflective grating, the retroreflector 46 is a corner cone retroreflector, and the input optical fiber 2 is used to transmit the linearly polarized light emitted by the single-frequency laser 1 to the reading head. Two channels of measurement light and two channels of reference light are transmitted in a space-separated manner, and enter the interferometer lens group at different positions, and generate two measurement interference signals and two reference interference signals. The measurement grating 5 can perform in-plane and vertical two-degree-of-freedom linear motion relative to the reading head 4. The output optical fiber 6 is a multimode optical fiber which is an optical fiber for receiving measurement interference signals and reference interference signals. Each of the interference signal and reference interference signal is provided in two channels, and are coupled and received, and output as four interference signals by the respective multimode optical fibers, respectively. The photoelectric conversion unit 7 converts the optical signals transmitted by the multimode optical fiber 6 into measurement interference electrical signals and reference interference electrical signals, respectively and output to the electronic signal processing unit 8. The electronic signal processing unit processes the received electrical signals, and calculates the linear displacement of the measurement grating 5.

Figure 6:
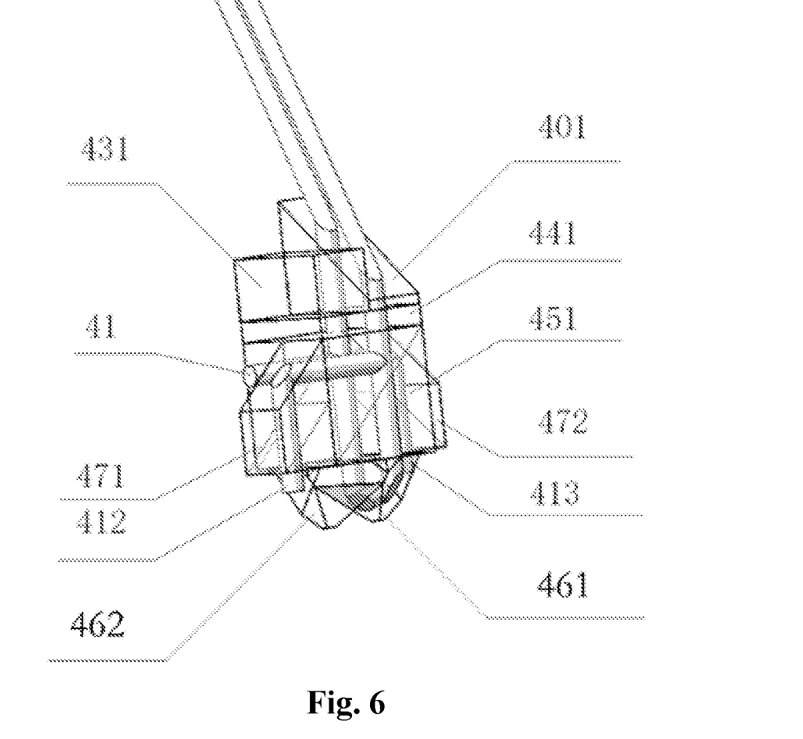
FIG. 6 is a schematic diagram of a first measurement laser light path of the present disclosure.
Figure 7:
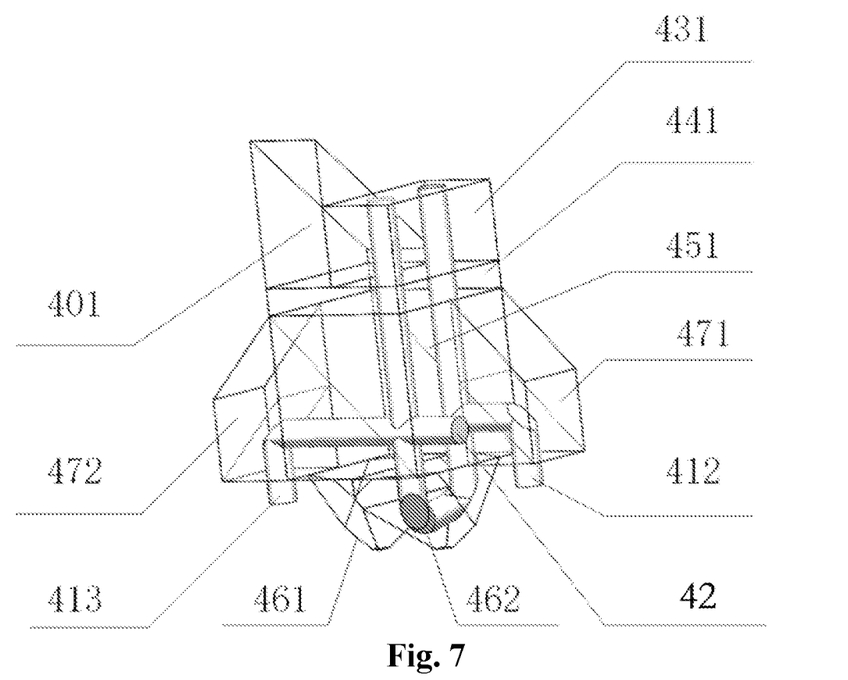
FIG. 7 is a schematic diagram of a first reference laser light path of the present disclosure.

FIG. 6 is a schematic diagram of the first measurement laser light path of the present disclosure, and FIG. 7 is a schematic diagram of the first reference laser light path of the present disclosure. The first measurement laser 41 and the first reference laser 42 are used to form one channel of a measurement interference signal and one channel of a reference interference signal to be output at the bottoms of the two lateral beam splitters, respectively. The second measurement laser 48 and the second reference laser 49 are used to form the other channel of measurement interference signal and the other channel of reference interference signal to be output at the bottoms of the other two lateral beam splitters, respectively.

Specifically, As shown in FIGS. 6 and 7, the measurement light is linearly polarized light, wherein the first measurement laser 41 which has a frequency of $f_1$, undergoes reflection and transmission after entering the first polarization beam splitter 451, and the reflected light corresponding to the first measurement laser 41 sequentially passes through the first quarter-wave plate 441, the first refractor 401, the measurement grating, the first refractor 401, the first quarter-wave plate 441, the first polarization beam splitter, the first retroreflector 461, the first polarization beam splitter, the first quarter-wave plate 441, the first refractor 401, the measurement grating, the first refractor 401, the first polarization beam splitter, and the first lateral beam splitter 471 so as to form the first measurement light. The first reference laser 42 which has a frequency of $f_2$, undergoes reflection and transmission after enters the first polarization beam splitter 451, and the reflected light corresponding to the first reference laser 42 sequentially passes through the first quarter-wave plate 441, the first reflector 431, the first quarter-wave plate 441, the first polarization beam splitter, the second retroreflector 462, the first polarization beam splitter, the first quarter-wave plate 441, the first reflector 431, the first quarter-wave plate 441, the first polarization beam splitter and the first lateral beam splitter prism 471 so as to form the first reference light. The first measurement light interferes with the first reference light, and finally forms the first measurement interference signal 412.

The transmitted lights corresponding to the first measurement laser 41 and the first reference laser 42 respectively pass through the second lateral beam splitter 472 so as to form the second measurement light and the second reference light. The second measurement light interferes with the second reference light and finally forms the first reference interference signal 413.

The second measurement laser 48 which has a frequency of $f_1$, undergoes reflection and transmission by the second polarization beam splitter 452, and the reflected light corresponding to the second measurement laser 48 sequentially passes through the second quarter-wave plate 442, the second refractor 402, the measurement grating, the second refractor 402, the second quarter-wave plate 442, the second polarization beam splitter 452, the third retroreflector 463, the second polarization beam splitter 452, the second quarter-wave plate 442, the second refractor 402, the measurement grating, the second refractor 402, the second polarization beam splitter 452, and the third lateral beam splitter 473 so as to form the third measurement light.

The second reference laser 49 which has a frequency of $f_2$, undergoes reflection and transmission by the second polarization beam splitter 452, and the reflected light corresponding to the second reference laser 49 passes through the second quarter-wave plate 442, the second reflector 432, the second quarter-wave plate 442, the second polarization beam splitter 452, the fourth retroreflector 464, the second polarization beam splitter 452, the second quarter-wave plate 442, the second reflector 432, the second quarter-wave plate 442, the second polarization beam splitter 452, and the third lateral beam splitter prism 473 so as to form a third reference light. The third measurement light interferes with the third reference light to form a second measurement interference signal 414.

The transmitted lights corresponding to the second measurement laser 48 and the second reference laser 49 respectively pass through the fourth lateral beam splitter prism 474 to form the fourth measurement light and the fourth reference light. The fourth measurement light interferes with the fourth reference light and finally forms the second reference interference signal 415.

In an embodiment, the single-frequency laser 1 emits a single-frequency laser that simultaneously contains s-polarization component and p-polarization component. The formation of one channel of measurement interference signal and one channel of reference interference signal is described as an example below. The formation principle of the other channel of measurement interference signal and the other channel of reference interference signal are basically the same.

Specifically, the single-frequency laser 1 emits two beams of single-frequency lasers. The respective beams of single-frequency lasers are coupled by the input optical fiber and then is incident on the acousto-optic modulator for frequency shifting. After being collimated by a Green lens, two channels of linearly polarized light with a frequency difference are obtained. Linearly polarized light contains both s-polarized and p-polarized components, two channels of which are used as reference light and the other two as measurement light.

The measurement light contains both s-polarized and p-polarized components. One channel of the measured light $f_1$ enters the polarization beam splitter to be reflected and transmitted. The reflected light sequentially passes through the quarter-wave plate 44, the refractor 43, the measurement grating 5, the refractor 43, the quarter-wave plate 44, the polarization beam splitter 45, the corner cone retroreflector 46, the polarization beam splitter 45, the quarter-wave plate 44, the refractor 43, the measurement grating 5, the refractor 43, the polarization beam splitter 45, and the lateral beam splitter prism 47, as the measurement light, to interfere with the reference light so as to finally form one channel of measurement interference signal.

The reference light also contains both the s-polarized and the p-polarized components. The reference light $f_2$ enters the polarization beam splitter and then is reflected and refracted. The reflected light sequentially passes through the quarter-wave plate 41, the reflector 43, the quarter-wave plate 44, the polarization beam splitter 45, the corner cone retroreflector 46, the polarization beam splitter 45, the quarter-wave plate 44, the reflector 43, the polarization beam splitter 45 and the lateral beam splitter prism 47 as reference light to interfere with the measurement light so as to finally form one channel of measurement interference signal.

The measurement interference signal formed by the measurement light and the reference light is a beat frequency signal, $$I_1 = (E_{r1}^R + E_{m1}^R) \overline{(E_{r1}^R + E_{m1}^R)} = I_{DC1} + I_{AC1} \times \cos(2\pi f t + \varnothing_1 + \varphi)$$

Here, $I_1$ is the measurement interference signal, $E_{r1}^R$ represents the reference light vector reflected by the polarization beam splitter, $E_{m1}^R$ represents the measurement light vector reflected by the polarization beam splitter, $I_{DC1}$ represents the amplitude of the DC component in the light intensity signal, and $I_{AC1}$ represents the amplitude of the AC component in the light intensity signal, f represents the frequency difference of the dual-frequency laser, $\varnothing_1$ represents the phase change value caused by the displacement of the measurement grating in the X and Z directions, $\varphi$ represents the initial phase difference between the measurement light and the reference light.

After the measurement light is transmitted through the polarization beam splitter, the transmitted light passes through the lateral beam splitter prism, as the measurement light, to interferes with the reference light so as to finally form one channel of reference interference signal. After the reference light is transmitted through the polarization beam splitter, the transmitted light passes through the lateral beam splitter prism as the reference light to interfere with the measurement light so as to finally form one channel of reference interference signal.

$$I_2 = (E_{r1}^T + E_{m1}^T) \overline{(E_{r1}^T + E_{m1}^T)} = I_{DC2} + I_{AC2} \times \cos(2\pi f t + \varnothing_1 + \varphi)$$

Here, $I_2$ is the reference interference signal, $E_{r1}^T$ represents the reference light vector reflected by the polarization beam splitter, $E_{m1}^T$ represents the measurement light vector reflected by the polarization beam splitter, $I_{DC2}$ represents the amplitude of the DC component in the light intensity signal, and $I_{AC2}$ represents the amplitude of the AC component in the light intensity signal, f represents the frequency difference of the dual-frequency laser, and $\varphi$ represents the same meaning as above.

As shown in FIGS. 1-7, the two channels of measurement interference signals and the two channels of reference interference signals are directly coupled through four respective output optical fibers 6 to form four respective channels of signals in total whose signal strengths can meet the measurement requirements. They are transmitted to the photoelectric conversion unit 7 to be converted into electrical signals, and then are output to the electronic signal processing unit 8 for processing, and the two-degree-of-freedom linear motion is calculated using the obtained phase information. If the measurement grating 5 moves linearly with two degrees of freedom in the horizontal and vertical directions relative to the reading head 4, the electronic signal processing unit 8 can calculate the linear displacements of the two degrees of freedom, $$x = \frac{\varnothing_1 - \varnothing_2}{4} \times \frac{p}{2\pi}$$

$$z = \frac{\varnothing_1 + \varnothing_2}{4} \times \frac{\lambda}{4\pi \cos\theta}$$

Here, x and z are the displacement of the measurement grating, $\varnothing_1$, $\varnothing_2$ are the phase changes of the two channels of the measurement interference signals relative to the two channels of the reference interference signals, p is the pitch of the measurement grating, $\lambda$ is the laser wavelength, and $\theta$ is the Littrow angle.

Figure 8:
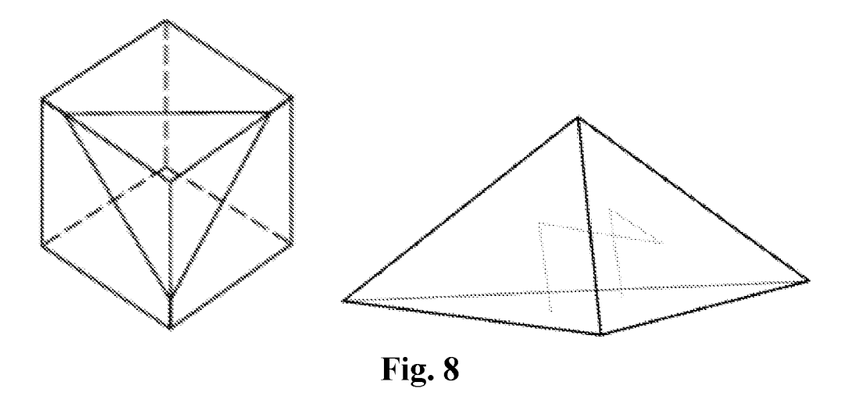
FIG. 8 is the schematic diagram of operation of the retroreflector of the present disclosure.

FIG. 8 is a schematic diagram of the operation principle of the retroreflector of the present disclosure. As shown in FIG. 8, the retroreflector is a corner cone retroreflector which is formed by cutting a corner from a cube. The three reflective surfaces of the corner cone retroreflector are perpendicular to one another, and the bottom surface is the incident surface and the exit surface of the corner cone retroreflector. When the light is incident on the bottom surface in any direction and is reflected sequentially by three right-angled surfaces, the outgoing light is always parallel to the incident light; therefore, it is ensured that when there is a rotation angle error in the measurement grating, the measurement light and the reference light can still interfere in parallel, the generation of interference fringes can be avoided, and the interferometry system has a large grating rotation angle tolerance.

The above disclosed heterodyne grating interferometry system based on secondary diffraction is a two-degree-of-freedom heterodyne grating displacement measurement system based on secondary diffraction light, which can simultaneously measure large-stroke in-plane and vertical linear displacements of two degrees of freedom. In addition, two channels of reference interference signals are provided ingeniously, which effectively suppresses the errors generated during the transmission in the optical fiber. Also, the reading head 4 is arranged in a modular manner, which reduces the difficulty in installation and alignment of the reading head. Further, the measurement light and reference light are transmitted in a space-separated manner, effectively avoiding the influence of the periodic nonlinear error caused by the polarization aliasing error on the measurement accuracy. In addition, the four-time subdivision of the interference signal is realized by using the secondary diffracted light, which achieves a higher optical subdivision compared to the primary diffracted light measurement system. The interferometer lens group adopts a retroreflector structure, which ensures that when there is a rotation angle error in the measurement grating, the measurement light and the reference light can still interfere in parallel, the generation of interference fringes can be avoided, and the system has a large rotation angle tolerance. In addition, the interferometry system has the advantages of small size, light weight, and convenient arrangement. It is suitable for occasions requiring multi-degree-of-freedom displacement precise measurement, such as ultra-precision workbenches for lithography machines and precision machine tools.

Of course, the present disclosure can also have other various embodiments, and those skilled in the art can make various corresponding modifications and variations according to the present disclosure without departing from the spirit and essence of the present disclosure, but these corresponding modifications and variations all belong to the protection scope of the claims of the present disclosure.

What is claimed is:

1. A heterodyne grating interferometry system based on secondary diffraction comprising a single-frequency laser, an input optical fiber, an acousto-optic modulator, a reading head, a measurement grating, an output optical fiber, a photoelectric converter and an electronic signal processing unit,
wherein the single-frequency laser emits a single-frequency laser beam, which enters the acousto-optic modulator through the input optical fiber, and is divided into a reference light and measurement light to be input to the reading head, wherein the reading head and the measurement grating convert the reference light and measurement light into a reference interference optical signal and a measurement interference optical signal and send them to the photoelectric converter through the output optical fiber,
wherein the photoelectric converter converts the measurement interference optical signal and the reference interference optical signal into a measurement interference electrical signal and a reference interference electrical signal and sends them to the electronic signal processing unit, and calculates 2-degree-of-freedom linear displacement of the measurement grating,
wherein the reading head comprises an interferometer lens group, the single-frequency laser emits multiple single-frequency laser beams, the multiple single-frequency laser beams are divided into multiple beams of reference light and multiple beams of measurement light by the acousto-optic modulator,
wherein the multiple beams of reference light and the multiple beams of measurement light are transmitted in a space-separated manner, and enter the interferometer lens group at respective different positions, and generate multiple channels of measurement interference signals and multiple channels of reference interference signals,
wherein the interferometer lens group comprises a plurality of reflectors, a plurality of quarter-wave plates, a plurality of polarization beam splitters, a plurality of retroreflectors, a plurality of lateral beam splitter prisms and a plurality of refractors,
wherein the single-frequency laser emits the multiple single-frequency laser beams, and the multiple single-frequency laser beams are divided into multiple beams of reference light and multiple beams of measurement light by the acousto-optic modulator,
wherein each of the multiple beams of reference light enters respective polarization beam splitters and each of the multiple beams of measurement light enter respective polarization beam splitters so as to be reflected and transmitted, to form multiple beams of reflected measurement light, multiple beams of transmitted measurement light, multiple beams of reflected reference light and multiple beams of transmitted reference light,
wherein the multiple beams of reflected measurement light pass through the respective quarter-wave plates, the respective refractors, the measurement grating, the respective refractors, the respective quarter-wave plates, the respective polarization beam splitters and the respective retroreflectors to be reflected multiple times, to form multiple beams of first measurement light,
wherein the multiple beams of transmitted measurement light pass through respective lateral beam splitter prisms to form multiple beams of second measurement light,
wherein the multiple beams of reflected reference light pass through the respective quarter-wave plates, the respective reflectors, the respective polarization beam splitters, the respective retroreflectors and the respective lateral beam splitter prisms to be reflected multiple times, to form multiple beams of first reference light,
wherein the multiple beams of transmitted reference light pass through respective lateral beam splitter prisms to form multiple beams of second reference light, and
wherein the multiple beams of first measurement light and the multiple beams of second measurement light interfere with the reference light to form the multiple channels of measurement interference signals, and the multiple beams of first reference light and second reference light interfere with the measurement light to form the multiple channels of reference interference signals.

2. The heterodyne grating interferometry system based on secondary diffraction according to claim 1, wherein the interferometer lens group comprises a first polarization beam splitter, a second polarization beam splitter, a first lateral beam splitter prism, a second lateral beam splitter prism, a third lateral beam splitter prism, a fourth lateral beam splitter prism, a first retroreflector, a second retroreflector, a third retroreflector, a fourth retroreflector, a first quarter-wave plate, a second quarter-wave plate, a first reflector, a second reflector, a first refractor and a second refractor,
wherein the single-frequency laser emits two single-frequency laser beams to form two beams of measurement light and two beams of reference light after passing through the acousto-optic modulator,
wherein one beam of measurement light passes through the first polarization beam splitter to be reflected and transmitted so as to form a beam of first reflected measurement light and a beam of first transmitted measurement light, and another beam of reference light passes through the first polarization beam splitter to be reflected and transmitted so as to form a beam of first reflected reference light and a beam of first transmitted reference light,
wherein the first reflected measurement light sequentially passes through the first quarter-wave plate, the first refractor, the measurement grating, the first refractor, the first quarter-wave plate, the first polarization beam splitter, the first retroreflector, the first polarization beam splitter, the first quarter-wave plate, the first refractor, the measurement grating, the first refractor, the first polarization beam splitter, and the first lateral beam splitter prism to form the first measurement light,
wherein the first transmitted measurement light passes through the second lateral beam splitter prism to form the second measurement light,
wherein the first reflected reference light sequentially passes through the first quarter-wave plate, the first reflector, the first quarter-wave plate, the first polarization beam splitter, the second retroreflector, the first polarization beam splitter, the first quarter-wave plate, the first reflector, the first quarter-wave plate, the first polarization beam splitter, and the first lateral beam splitter prism to form the first reference light, wherein the first transmitted reference light passes through the second lateral beam splitter prism to form the second reference light, wherein the first measurement light interferes with the first reference light to form a first measurement interference signal and the second measurement light interferes with the second reference light to form a first reference interference signal, wherein the other beam of measurement light passes through the second polarization beam splitter to be reflected and transmitted so as to form a beam of second reflected measurement light and a beam of second transmitted measurement light, and the other beam of reference light passes through the second polarization beam splitter to be reflected and transmitted so as to form a beam of second reflected reference light and a beam of second transmitted reference light, wherein the second reflected measurement light sequentially passes through the second quarter-wave plate, the second refractor, the measurement grating, the second refractor, the second quarter-wave plate, the second polarization beam splitter, the third retroreflector, the second polarization beam splitter, the second quarter-wave plate, the second refractor, the measurement grating, the second refractor, the second polarization beam splitter and the third lateral beam splitter prism to form a third measurement light, wherein the second transmitted measurement light passes through the fourth lateral beam splitter prism to form a fourth measurement light, wherein the second reflected reference light passes through the second quarter-wave plate, the second reflector, the second quarter-wave plate, the second polarization beam splitter, the fourth retroreflector, the second polarization beam splitter, the second quarter-wave plate, the second reflector, the second quarter-wave plate, the second polarization beam splitter, and the third lateral beam splitter prism to form a third reference light, wherein the second transmitted reference light passes through the fourth lateral beam splitter prism to form a fourth reference light, and wherein the third measurement light interferes with the third reference light to form a second measurement interference signal and the fourth measurement light interferes with the fourth reference light to form a second reference interference signal.

3. The heterodyne grating interferometry system based on secondary diffraction according to claim 1, wherein each of the polarization beam splitters has two lateral beam splitter prism respectively disposed in front of and behind the polarization beam splitter, each of the polarization beam splitters has two retroreflector disposed therebelow, each of the polarization beam splitters has one quarter-wave plate disposed thereabove, and each of quarter-wave plates has one reflector and one refractor disposed in parallel thereabove.

4. The heterodyne grating interferometry system based on secondary diffraction according to claim 2, wherein the first measurement light and the second measurement light interfere with the reference light to form two channels of measurement interference signals, and the first reference light and the second reference light interfere with the measurement light to form two channels of reference interference signals.

5. The heterodyne grating interferometry system based on secondary diffraction according to claim 1, wherein the input optical fiber comprises a polarization-maintaining optical fiber, the output optical fiber comprises a multimode optical fiber, and the measurement grating comprises a one-dimensional reflective grating, and the retroreflector comprises a corner cube retroreflector.

6. The heterodyne grating interferometry system based on secondary diffraction according to claim 1, wherein the refractor satisfies the Littrow angle incident condition of the measurement light.

7. The heterodyne grating interferometry system based on secondary diffraction according to claim 6, wherein the reflected measurement light forms primary diffracted light after being diffracted by the measurement grating, wherein the primary diffracted light sequentially passes through the refractor, the quarter-wave plate and the polarization beam splitter and enters the retroreflector, wherein the retroreflector emits the incident primary diffracted light in parallel, and the emitted primary diffracted light sequentially passes through the polarization beam splitter, the quarter-wave plate, and the refractor, and enters the measurement grating again in the Littrow angle so as to form a secondary diffracted light.

8. The heterodyne grating interferometry system based on secondary diffraction according to claim 1, wherein the measurement grating performs in-plane and vertical linear motions with two degrees of freedom relative to the reading head.

9. The heterodyne grating interferometry system based on secondary diffraction according to claim 2, wherein the reading head is disposed in a modular arrangement, comprising a first reading head module and a second reading head module, wherein the first reading head module generates the first measurement interference signal and the first reference interference signal, and the second reading head module generates the second measurement interference signal and the second reference interference signal, and wherein optical paths in the first reading head module and the second reading head module are not interfered with each other, and the first reading head module and the second reading head module are connected through a connector.

* * * * *